United States Patent [19]

Sobotta

[11] 4,127,324

[45] Nov. 28, 1978

[54] DUAL PHOTOGRAPHIC SLIDE PROJECTOR

[75] Inventor: Reinhard Sobotta, Brunswick, Germany

[73] Assignee: Rollei-Werke Franke & Heidecke, Brunswick, Germany

[21] Appl. No.: 806,560

[22] Filed: Jun. 14, 1977

Related U.S. Application Data

[63] Continuation-in-part of Ser. No. 725,140, Sep. 17, 1976, Pat. No. 4,063,465, and Ser. No. 777,834, Mar. 15, 1977, Pat. No. 4,069,724.

[30] Foreign Application Priority Data

Jun. 22, 1976 [DE] Fed. Rep. of Germany ....... 2627815

[51] Int. Cl.$^2$ ............................................. G03B 23/04
[52] U.S. Cl. ....................................... 353/116; 353/94
[58] Field of Search .................... 353/116, 103, 83, 86, 353/90, 94

[56] References Cited

U.S. PATENT DOCUMENTS

| | | | |
|---|---|---|---|
| 3,242,804 | 3/1966 | Brinkmann | 353/116 |
| 3,572,920 | 3/1971 | Heinzmann | 353/103 |
| 3,847,472 | 11/1974 | Sobotta | 353/116 |

*Primary Examiner*—Steven L. Stephan
*Attorney, Agent, or Firm*—Stonebraker, Shepard & Stephens

[57] ABSTRACT

A double slide projector having two slide projection assemblies, a common magazine for slides, and a common slide changer, uses a motion transmitting arrangement from a drive to the changer so that the changer is moved a full stroke for moving slides from the magazine to the more remote projection assembly and the changer motion is blocked at a partial stroke for movement of slides from the magazine to the nearer projection assembly. A drive provides sufficient movement to move the changer for a full stroke for each actuation, and a slip clutch is arranged in the motion transmitting device so that the changer can move alternately between a full-stroke and a blocked or partial-stroke position. A double-track cam is preferred for the drive, and an arrangement of levers connected through the slip clutch is preferred for transmitting motion from the cam to the gripper portion of the slide changer.

10 Claims, 4 Drawing Figures

DUAL PHOTOGRAPHIC SLIDE PROJECTOR

CROSS REFERENCE TO RELATED APPLICATIONS

This is a continuation-in-part of my copending applications Ser. No. 725,140, filed Sept. 17, 1976, entitled Magazine Feeding Mechamism for Dual Slide Projectors (now U.S. Pat. 4,063,465, granted Dec. 20, 1977) and Ser. No. 777,834, filed Mar. 15, 1977, entitled Flat Curve Cam and Follower Construction (now U.S. Pat. No. 4,069,724, granted Jan. 24, 1978).

BACKGROUND OF THE INVENTION

The invention relates to a double or dual slide projector having two projector assemblies combined in a single appliance. Each projection assembly preferably includes a light source, condenser lens, and slide frame, and the projection assemblies are arranged parallel with each other and movable between two positions for projection and slide change. One possible arrangement for such a double slide projector is shown in my U.S. Pat. No. 3,847,472, issued on Nov. 12, 1974.

The double slide projector in which the invention occurs also uses a common magazine for slides, and a common slide changer for moving slides back and forth between the magazine and the projection assemblies. Slide changing occurs along a slide change plane between the magazine and slide frames of the projection assemblies, when the projection assemblies are in their axially rearward position to locate their slide frames on the slide change plane. The magazine proceeds in a "pilgrim step" motion of advancing two steps and retracting one step so that slides alternately moved into the projection assemblies are returned to the magazine in their original sequence. Such a motion is described in my parent application U.S. Pat. No. 725,140. The magazine is preferably movable along a path adjacent the projection assemblies so that one of the projection assemblies is more remote from the magazine and the other projection assembly is nearer the magazine.

Such a double slide projector requires a simple and reliable slide changer mechanism for alternately moving slides back and forth between the magazine and the remote and nearer projection assemblies. This is solved according to the invention with a slide changer having full-stroke and partial-stroke motions for gripping and moving slides alternately between the different distances required. The invention also aims at simplicity, economy, reliability, and quiet and trouble-free operation in a slide changer producing the required slide movement for a double slide projector.

SUMMARY OF THE INVENTION

The invention applies to a double slide projector having two slide projection assemblies arranged parallel with each other and each having a slide frame. The slide projection assemblies are alternately movable axially between a projection position and a slide change position where the slide frame is outside the light path of the projection assembly in the projection position. The projection includes a common magazine from which slides are taken in progressive sequence and to which slides are returned in the same sequence, and a common slide changer for moving slides from the magazine alternately into the slide frames of the projection assemblies in their slide change position and back to the magazine. The slide changer alternately moves for a full stroke from the magazine to the projection assembly remote from the magazine and for a partial stroke from the magazine to the projection assembly nearer to the magazine.

The invention involves movement of the slide changer in response to a drive for the slide changer, and it includes means for transmitting motion from the drive to the changer, with movement of the drive being sufficient to move the changer through a full stroke for each actuation of the drive. The motion transmitting means includes a slip clutch, and a stop is movably disposable into the path of movement of the changer in response to the position of the projection assemblies to limit movement of the changer to a partial stroke. After the changer movement is limited by the stop, the slip clutch allows the drive to complete its actuation without further movement of the changer, and when the position of the projection assemblies is appropriate, the stop is moved out of the path of the changer so that it executes a full-stroke movement.

The stop is preferably biased into the path of movement of the changer and moved aside in response to positioning of the remote projection assembly in the slide change position. The drive for the changer preferably includes a cam disk having two cam tracks with followers arranged on pivotal levers, and the slip clutch is preferably arranged between a cam follower lever and a lever articulated to the gripper element of the slide changer.

DETAILED DESCRIPTION OF THE PREFERRED EMBODIMENT

The drawings illustrate a preferred embodiment of a slide changer system for a double slide projector and omit all the projector parts that are not involved in the invention and would otherwise detract from the clarity of the description.

Figure 1:
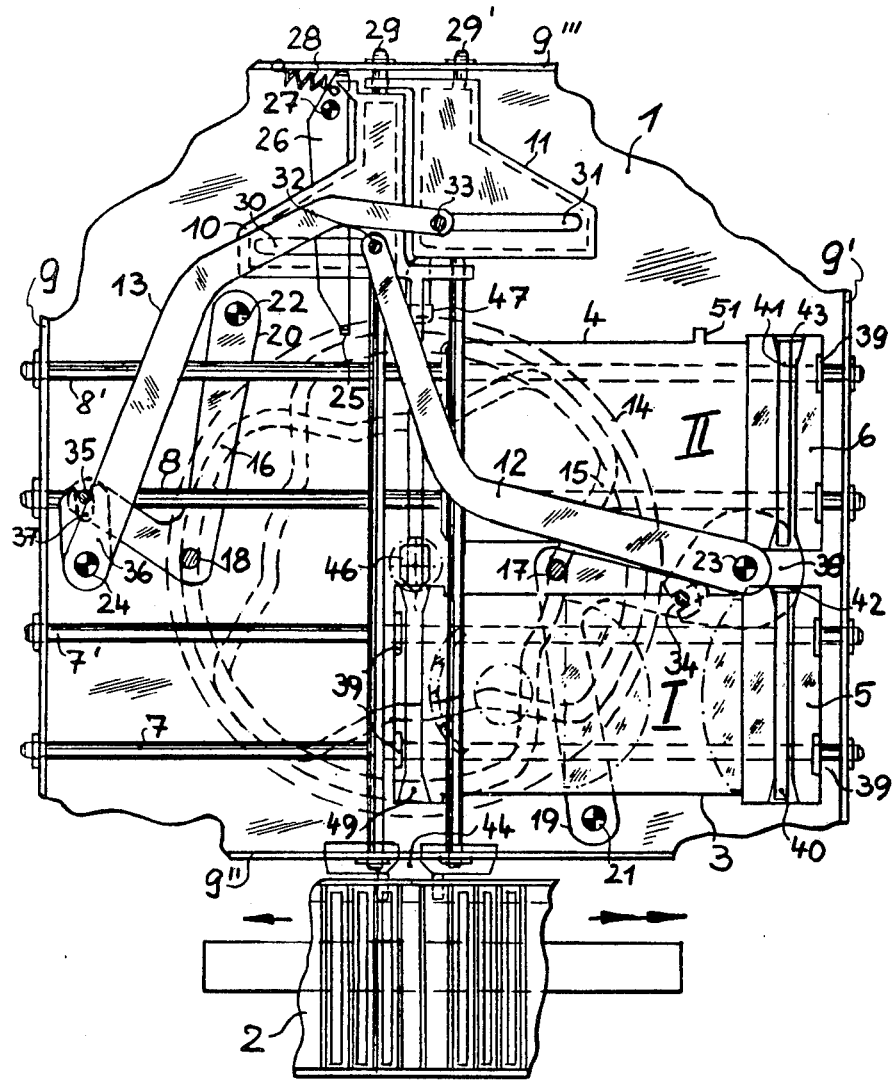
FIG. 1 is a fragmentary and partially schematic plan view of a preferred embodiment of the inventive changer drive with both projection assemblies in the projection position and slides in each slide frame.

The two projection assemblies 3 and 4 for the illustrated embodiment are arranged alongside the magazine 2, and the projection assemblies 3 and 4 are also respectively identified as I and II. The projection assemblies lie side by side in the same plane and slide back and forth along the optical axis or projection direction in carriages supported by the bushings 39 on the guide rods 7, 7', and 8, 8', which are formed as smooth cylindrical rods supported by the lugs 9, 9' that are bent upward from the bottom plate 1. The projection assemblies 3 and 4 preferably include light sources, condenser lenses, and the slide frames 5 and 6 for receiving slides for projection. The projection assemblies are shown in FIG. 1 in their forward or projection position, and projection assemblies I and II are respectively shown in FIGS. 2 and 3 in their rearward or slide change position in which the slide frame 5 or 6 of the rearward projection assembly is behind the light path of the other projection assembly in the forward, projection position.

The invention involves a slide changer mechanism for removing slides from the magazine 2 and placing them alternately into the appropriate slide frame 5 or 6 and returning the slides from the projection assemblies back to the magazine 2 in their original sequence. A gripper 10 moves slides from the magazine 2 into one of the slide frames 5 or 6, and a pusher 11 pushes slides from one of the slide frames back into the magazine. The structure and operation of the gripper 10 and the pusher 11 according to the invention is advantageously quiet, compact, simple, and reliable, as explained below.

A cam disk 14 provides the main drive for the slide changer mechanism, and the cam disk 14 is driven by a conventional electric motor with reduction gearing in a generally known way. The cam disk 14 has two cam paths or tracks 15 and 16 that are respectively tracked by the follower pins 17 and 18 for driving the gripper 10 and the pusher 11. The follower pin 17 is mounted on a lever 19 that is pivotally mounted on a pivot 21 to move in response to the cam path 15, and the follower pin 18 is mounted on a lever 20 that is pivotally mounted on a pin 22 for moving as the cam path 16 varies. The cam tracks 15 and 16 repeat twice around the periphery of cam disk 14, which rotates one-half turn for each actuation. The cam paths allow smooth transitions between operating and non-operating conditions for smoothly executing the movements of other elements of the slide changer to accomplish quiet and reliable results. One suitable form for the cam disk 14 is disclosed in my parent application Ser. No. 777,834.

The pivotal motion of the levers 19 and 20 as the followers 17 and 18 track in the cam slots 15 and 16 is transmitted respectively to the gripper lever 12 and a pusher lever 13, which are respectively mounted on pivots 23 and 24. The free ends of the levers 12 and 13 carry the pins 32 and 33 that engage slots 30 and 31 respectively arranged in the gripper 10 and the pusher 11. The pin-and-slot connection between the levers 12 and 13 and the gripper 10 and the pusher 11 allows relatively long interconnected travel for these elements. The gripper 10 and the pusher 11 are slideably mounted on bearing rods 29 and 29' that are mounted on lugs 9" and 9'" that are bent upward from the baseplate 1. The gripper 10 has a gripper head 46 that engages and moves a slide from the magazine 2 toward the slide frames of the projection assemblies, and the pusher 11 has a pusher head 47 that engages the opposite edges of slides for movement from the slide frames of the projection assemblies back toward the magazine 2.

To achieve relatively long gripping and pushing strokes and still use minimum possible cam deflections and keep the diameter of the cam disk 14 sufficiently small, additional levers or links are provided between the levers 19 and 20 and the levers 12 and 13. The free end of the lever 20 has a peg 35 that fits in a notch 37 of an intermediate lever or link 36 rigidly secured to the pivot shaft 24 along with the pusher lever 13, and the connection between the pin 35 and the slot 37 of the link 36 is arranged to increase the pivot ratio to give pusher lever 13 a longer length of travel relative to the deflection of the cam track 16. In a similar way, the free end of the lever 19 carries a pin 34 that engages a slot 54 of an element of a slip clutch 38 transmitting motion between the lever 19 and the gripper lever 12 as explained more fully below.

Figure 4:
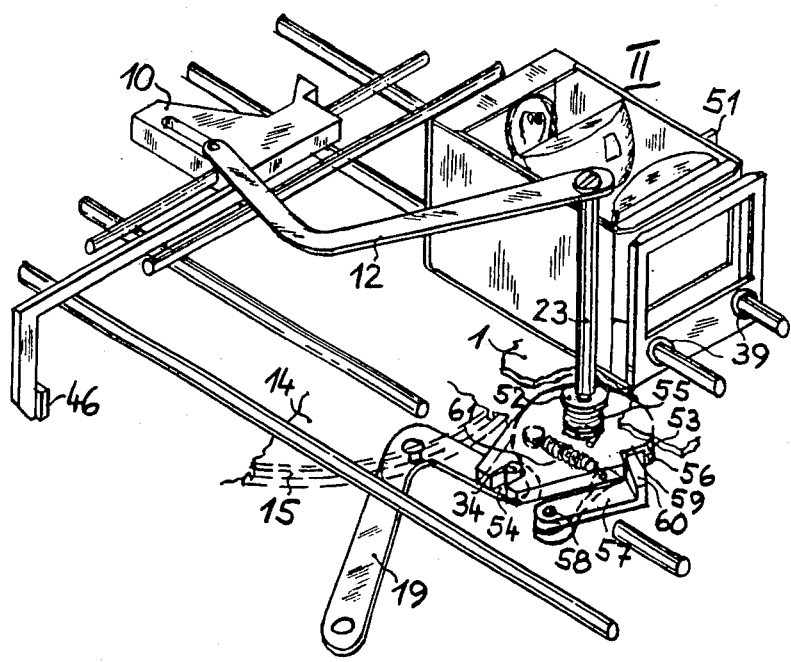
FIG. 4 is a fragmentary and partially schematic perspective view of the drive for the gripper portion of the changer of FIGS. 1—3.

The slip clutch 38 is provided in the gripper drive as best shown in FIG. 4 to allow the gripper 10 to execute both full and partial strokes as alternately required for the loading of projection assemblies 3 and 4 with slides. This allows uniform actuation of the changer drive on each half-turn of the cam disk 14 without complicating the changer mechanism by expensive additional control devices. The slip clutch 38 is arranged on the lower end of the pivot shaft 23 carrying the gripper lever 12 and is preferably formed as a two-disk clutch. The shaft 23 is rotatably mounted in the bottom plate 1 between two securing disks, of which only the lower disk 52 is shown. Beneath the bottom plate a firstclutch disk 53 is loosely rotatably mounted on the shaft 23 and formed as a forked disk 53 having an open notch or slot 54 engaged by the pin 34 on the free end of the pivotal lever 19. Beneath the forked disk 53 at the lower end of the gripper shaft 23, a second-clutch disk 56 is rigidly connected to the gripper shaft 23 to rotate with the shaft 23 and with the gripper lever 12. The second clutch disk 56 carries a pawl 57 rotatably mounted on a pivot 58 and biased toward the upper disk 53 by a spring 61. The pawl 57 has an upwardly angled nose or projection 60 protruding into a cutout or recess 59 of the forked disk 53.

The slip clutch 38 is preferably arranged to have two frictional forces or moments during rotation. First, a compression spring 55 bears against securing disk 52 and presses the forked disk 53 downward into engagement with the lower disk 56, and this produces friction between the disks 53 and 56 that tends to rotate the disk 56 and the shaft 23 when the forked disk 53 is turned by the lever 19. To obtain additional security against slippage of the clutch 38 and reliable movement of slides into the projection assemblies, the projection 60 of the pawl 57 is pressed into the recess 59 of the forked disk 53 in a nearly interlocking manner because of the corresponding shapes or contours and the tension of the spring 61 so that the frictional force provided by spring 55 combines with the frictional force provided by the pawl 57 and the spring 61 for rotating the shaft 23 and both disks of the slip clutch 38 when the lever 19 pivots.

When the gripper 10 is to execute only a partial stroke for moving a slide from the magazine into the nearer one of the projection assemblies, it is not desirable to allow the total friction of the slip clutch 38 to continue to act for the entire movement of the cam disk 14 and the lever 19. So when the gripper 10 is stationary after execution of a partial stroke and the cam disk 14 and the lever 19 continue with the remainder of their movement, the pawl 57 disengages from the recess 59 so that the projection 60 slides along the edge of the forked disk 53 in a very low-friction engagement. This reduces the frictional engagement of the slip clutch 38 to little more than the friction between the disks 53 and 56 under the bias of the spring 55. Such an arrangement gives the gripper 10 a relatively positive and forceful drive through slip clutch 38 during the initial portion of each stroke for reliably moving a slide out of the magazine and toward the nearer projection assembly, and then reduces the engaging force of the slip clutch 38 by removing the pawl 57 from the notch 59 after the gripper 11 has been stopped at the end of a partial stroke.

A slip clutch is not necessary for the slide pusher 11 which operates for a full stroke on each actuation.

Whether the slide to be returned to the magazine is in the nearer or more remote projection assembly, the pusher 11 begins each return stroke movement from its extreme position furthest from the magazine and travels all the way to the magazine so that a clutch is not necessary in the pusher drive train.

FIG. 4 also shows that the drive train elements for the changer lie on different planes and transmit driving motion from lowermost elements below the bottom plate 1 upward through pivot shafts to the uppermost gripper and pusher parts. This helps make the device simple and compact.

Figure 2:
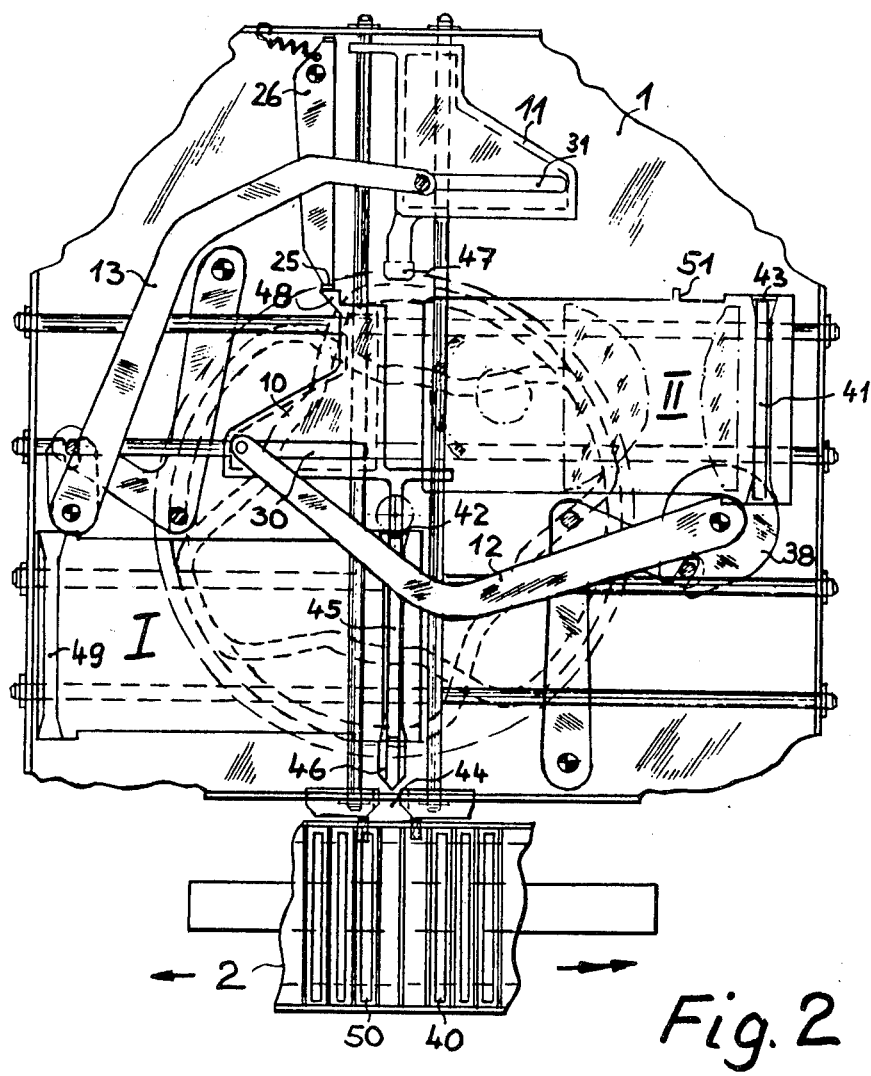
FIG. 2 is a fragmentary and partially schematic plan view similar to the view of FIG. 1 showing the elements of the inventive changer positioned to fill the slide frame of the projection assembly nearer the magazine.

A stop lever 26 having a stop 25 is mounted on a pivot 27 and biased by a spring 28 for normally assuming a stop position as shown in FIGS. 1 and 2. In such a position, stop 25 engages a projection 48 on the gripper 10 to limit movement of the gripper 10 to a partial stroke for moving a slide to the projection assembly 3 nearer the magazine 2. A projection 51 on the carriage of the projection assembly 4 is positioned to engage the stop 25 and pivot the stop lever 26 out of the stop position when the projection assembly 4 is in its rearwardmost slide change position with its slide frame 6 aligned with the slide change plane 44. This conveniently makes the stop lever 26 responsive to the rearward position of the slide projection assembly 4 to allow full-stroke movement of the gripper 10 when a slide is to be moved all the way into the slide frame 6 of the more remote of the projection assemblies.

At the beginning of a showing of a series of slides, the projection assemblies I and II are loaded directly one after the other with slides 40 and 41 which are pushed by the gripper 10 to the stops 42 and 43. As shown in FIG. 1, the projection assemblies are advanced into the projection position, and the projection lamp and its optical system are indicated in broken lines for assembly I to indicate that it is projecting. Projection assembly II is then standing by with a slide ready for projection, and the transfer of projection from one assembly to the other is preferably made by gradually darkening and lightening the respective lamps. As this occurs, all the parts remain in the position shown in FIG. 1.

Figure 3:
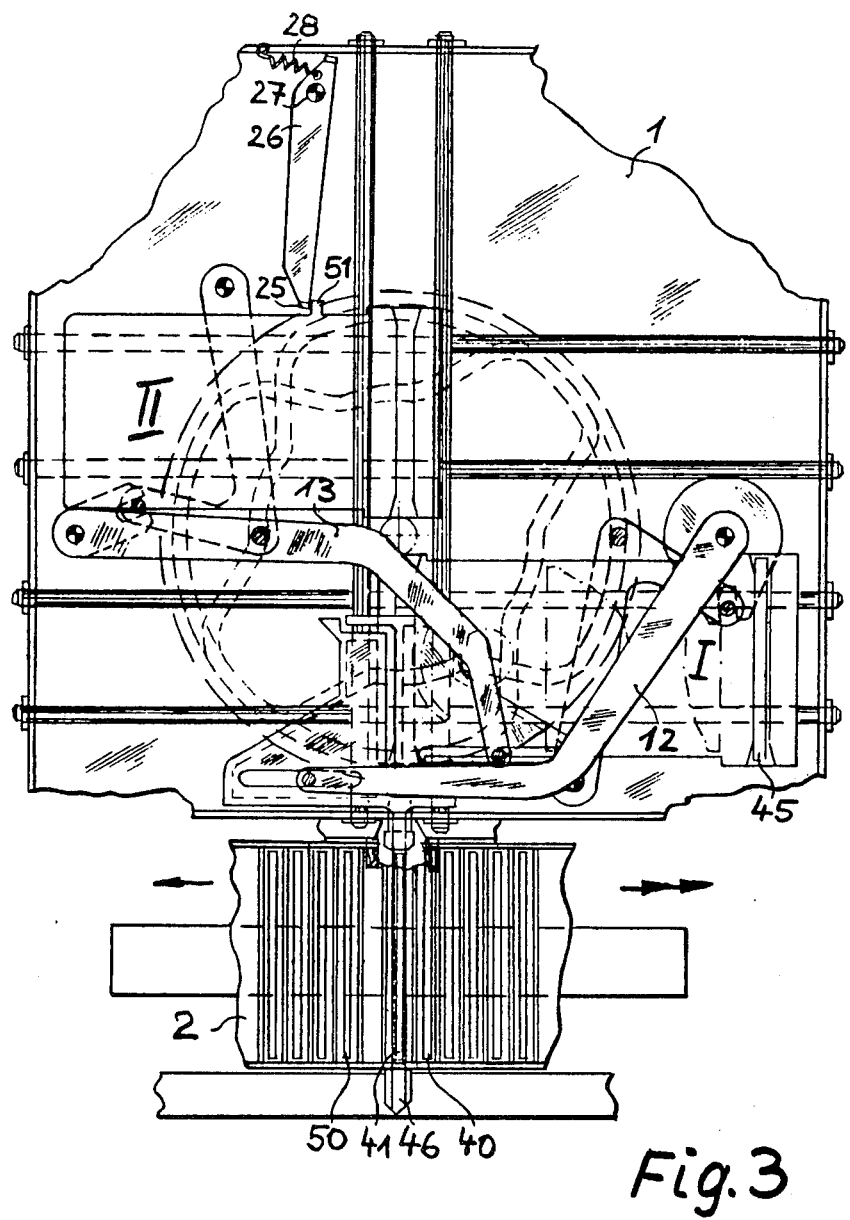
FIG. 3 is a fragmentary and partially schematic plan view similar to the view of FIG. 1 showing the elements of the inventive changer positioned to return a slide from the remote projection assembly to the magazine.

After projection assembly II is completely illuminated and projection assembly I is darkened, the drive is actuated for a one-half rotation of the cam disk 14 for a slide change cycle. First, the gripper 10 travels behind the projection assemblies and proceeds to its opposite end position as shown in FIG. 3 where its gripper head 46 is on the far side of the magazine 2. Then the projection assembly I moves rearwardly from the projection plane to bring its slide frame 5 into the slide change plane 44, and the mechanism for accomplishing this is generally known and preferably includes a cam disk and linkages engaging carriages for the projection assemblies. This movement brings the projection assemblies into the position illustrated in FIG. 2.

As soon as this has happened, the slide pusher 11 travels the same path as the slide gripper 10 behind the projection assembly II and through the slide frame 5 of the projection assembly I and pushes the already-projected slide 40 from there into the same magazine compartment from which it was previously taken. In order to achieve this, the magazine has been moved backward one step in a known manner by its separate drive, so that the numerically correct magazine compartment stands opposite the slide change plane 44. The pusher 11 then moves back to its rear end position as shown in FIG. 1 immediately after it completes the ejection of a slide.

After this has been accomplished, the magazine proceeds two compartments forward to align the next slide 45 with the slide change plane 44. The gripper 10 has been standing with its gripper head 46 extending beyond the magazine 2 and now travels inward so that the gripping head 46 engages and moves the slide 45 inward into the slide frame 5 of the projection assembly I.

Because the projection assembly II is in the advanced or projection position during these slide change operations, the stop 25 of the stop lever 26 is positioned in the path of the gripper 11 under the bias of the spring 28 so that the gripper 11 is stopped when its abutment 48 engages the stop 25. This moves the slide 45 up to the stop 42 of the slide frame 5 of the projection assembly I. The continued full-stroke course of movement of the cam disk 14 and the lever 19 tending to move the gripper 10 beyond this point is effective only to slip the clutch 38, which has its slip friction reduced by movement of the pawl 57 as described above for relatively easy operation.

When the slide change cycle is completed, the projection assembly I advances again into its projection position to project an image from the slide 45. The time duration required for a slide change as described above also determines the minimum time duration of the actual slide projection from the unit which is projecting while the slide change occurs. Then a changeover is made between projection assemblies I and II as previously described, and a new slide change cycle is actuated by moving the gripper 10 to its forward end position as shown in FIG. 3. Then the projection assembly II is moved back to bring its slide frame 6 into alignment with the slide change plane 44, and the magazine 2 moves backward one compartment. The pusher 11 then moves all the way to its forward end position to push the slide 41 all the way from the projection assembly II into the compartment of the magazine 2 from which it came. A slide bridge 49 is arranged in alignment with the slide change plane 44 to allow the slide to move from the projection assembly II across the space behind the projection assembly I. The pusher 11 then returns to its inactive position as shown in FIGS. 1 and 2, and the magazine 2 advances two steps forward. The slide 50 now stands in alignment with the slide change plane 44 and is engaged by the gripper head 46 when the gripper 10 begins its movement. Because the projection assembly II is in its rearward position, the projection 51 has moved the stop lever 26 to bring the stop 25 out of the path of the gripper 10 so that the gripper 10 travels through a full stroke of movement to move the slide 50 all the way from the magazine 2 into the picture frame 6 of the projection assembly II. The slip clutch 38 does not need to slip during this motion.

For every change cycle, the cam disk 14 travels exactly one-half revolution. The gripper and pusher cam tracks 15 and 16 are made symmetrical in shape and are formed to be somewhat offset relative to each other in the cam disk 14. One half of the total circuit of the cam tracks is traveled for each slide change cycle, and yet an adequate cam path distance is provided so that each slide change operation commences smoothly and without noise after the cam disk 14 starts up for a one-half revolution. This also helps start and stop the changer mechanism without jerks and with an extraordinarily low noise level, since the cam allows the movements to begin gradually and avoid surges occurring from switching on of a drive motor. The stop lever 26 and the slip clutch 38 cooperatively combine to provide a simple and expedient way of limiting the gripper 10 to a precise partial stroke operation reliably responsive to the position of the projection assembly II all with a minimum of complexity. This also uses the necessary movement of the projection assembly remote from the magazine as a means for moving the stop 25 out of the path of the gripper 10 for precise and reliable control without adding additional mechanisms.

What is claimed is:

1. A double slide projector having two slide projection assemblies arranged parallel with each other and each having a slide frame, said slide projection assemblies being alternately movable axially between a projection position and a slide change position where said slide frame is outside the light path of the projection assembly in the projection position, a common magazine from which slides are taken in progressive sequence and to which slides are returned in the same sequence, a common slide changer for moving slides from said magazine alternately into said slide frames of said projection assemblies in said slide change position and back to said magazine, said slide changer alternately moving for a full stroke from said magazine to the one of said projection assemblies remote from said magazine and for a partial stroke from said magazine to the one of said projection assemblies nearer to said magazine, and a drive for said slide changer, said projector being characterized by:
   a. means for transmitting motion from said drive to said changer, movement of said drive being sufficient to move said changer for said full stroke for each actuation of said drive;
   b. said motion transmitting means including a slip clutch; and
   c. a stop movably disposable into the path of movement of said changer in response to the position of said projection assemblies to limit movement of said changer to said partial stroke,
   d. said stop being biased into said path of movement of said changer and being moved out of said path of movement of said changer against said bias in response to movement of said projection assembly remote from said magazine into said slide change position.

2. The projector of claim 1 wherein said stop is arranged on a rotatably mounted lever, and a spring is arranged for providing said bias.

3. The projector of claim 1 wherein said changer includes a gripper for moving a slide from said magazine into one of said slide frames and a pusher for moving a slide from one of said slide frames into said magazine, and said projector is further characterized by said slip clutch being arranged in said motion transmitting means for said gripper, and said stop being movably disposable into the path of movement of said gripper.

4. The projector of claim 3 wherein said drive includes a cam disk having two separate cam paths, two separate cam followers are arranged for following said cam paths, a first pair of pivotal levers carry said cam followers, and a second pair of pivotal levers are connected respectively with first levers and with said gripper and said pusher.

5. The projector of claim 4 wherein said slip clutch is arranged between one of said first levers and the one of said second levers that is articulated to said gripper.

6. The projector of claim 5 wherein said slip clutch includes a first clutch disk movable with said first lever, a second clutch disk movable with said second lever, a compression spring for urging said clutch disks into frictional engagement, a springloaded pawl pivotally mounted on one of said clutch disks, said pawl having a projection, and the other of said clutch disks having a depression engaged by projection for increasing the frictional engagement between said clutch disks.

7. The projector of claim 6 wherein said clutch disks have interlocking shapes for movement with each other through an initial portion of the movement of said gripper, and said pawl projection is arranged for disengaging from said depression after blocking of said gripper movement by said stop to leave said cam disks engaging each other only with the frictional force supplied by said compression spring.

8. A dual photographic slide projector comprising means for holding a slide magazine, a first slide projection assembly arranged relatively close to said magazine, a second slide projection assembly arranged farther from said magazine and on the opposite side of said first assembly from said magazine, each of said assemblies including a slide receiving frame for receiving a slide and holding it in position to be projected, each of said assemblies being movable axially forwardly and backwardly between a forward projection position and a rearward slide loading and unloading position, slide changing means movable alternatively through a long stroke sufficient to move a slide from said magazine to the slide receiving frame of said second projection assembly and through a short stroke sufficient to move a slide from said magazine to the slide receiving frame of said first projection assembly, said slide changing means tending at each cycle of operation to move through a long stroke, stroke limiting means having an effective position limiting movement of said slide changing means to a short stroke and having an ineffective position not limiting such movement, and means controlled by movement of one of said projector assemblies for determining the position of said stroke limiting means.

9. The invention defined in claim 8, further comprising means tending to maintain said stroke limiting means in its effective position, wherein movement of said second projection assembly rearwardly from its forward projection position to its rearward slide loading position serves to shift said stroke limiting means to its ineffective position.

10. The invention defined in claim 9, further comprising a drive member for driving said slide changing means, and slip clutch means operatively interposed between said drive member and said slide changing means, said drive member tending to move said slide changing means through a long stroke without slipping of said clutch if said long stroke is not impeded, said stroke limiting means when in its effective position serving to impede further movement of said slide changing means after completion of a short stroke thereof and said slip clutch then slipping to permit continued motion of said drive member without continuation of the same stroke of said slide changing means.

* * * * *